United States Patent office.

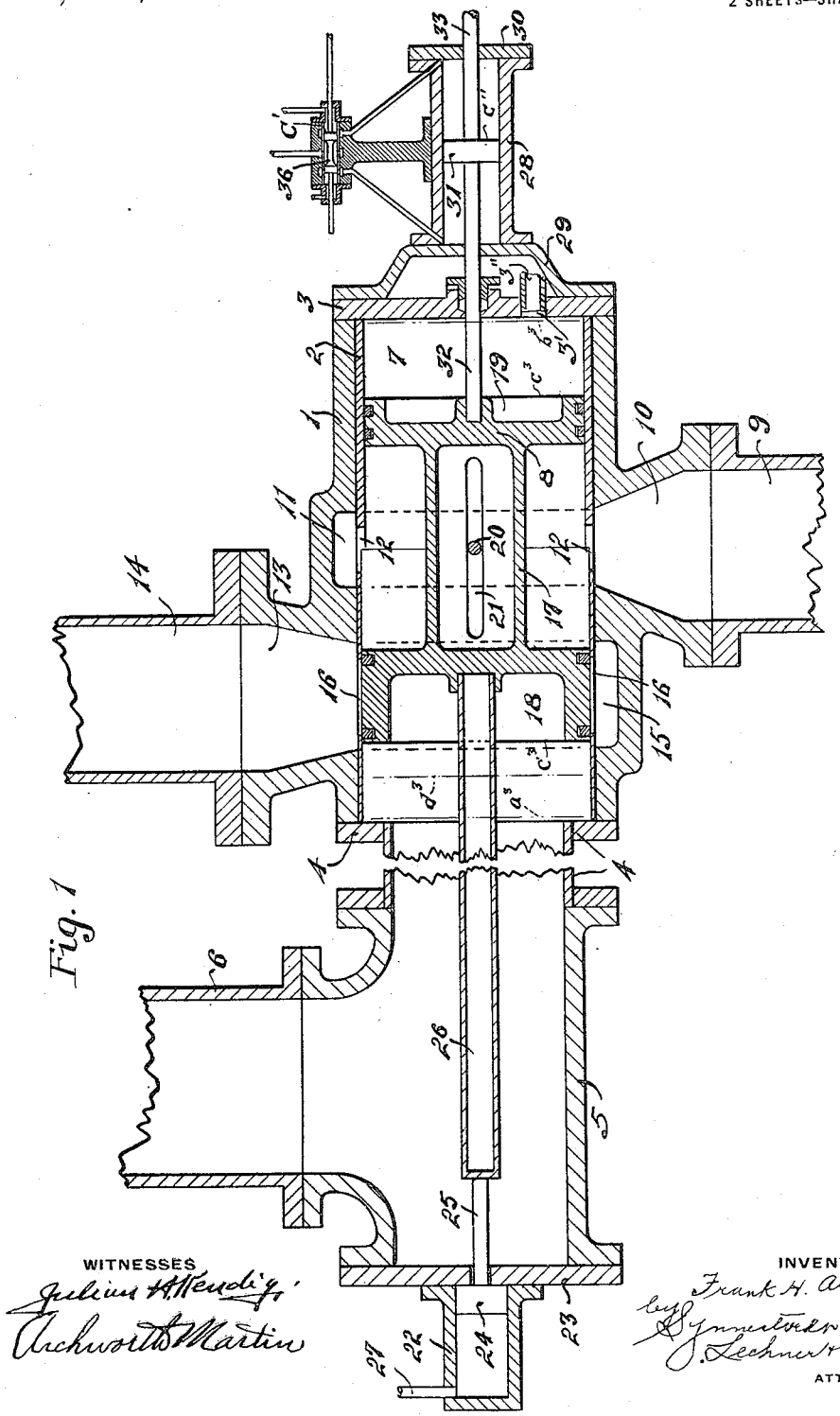

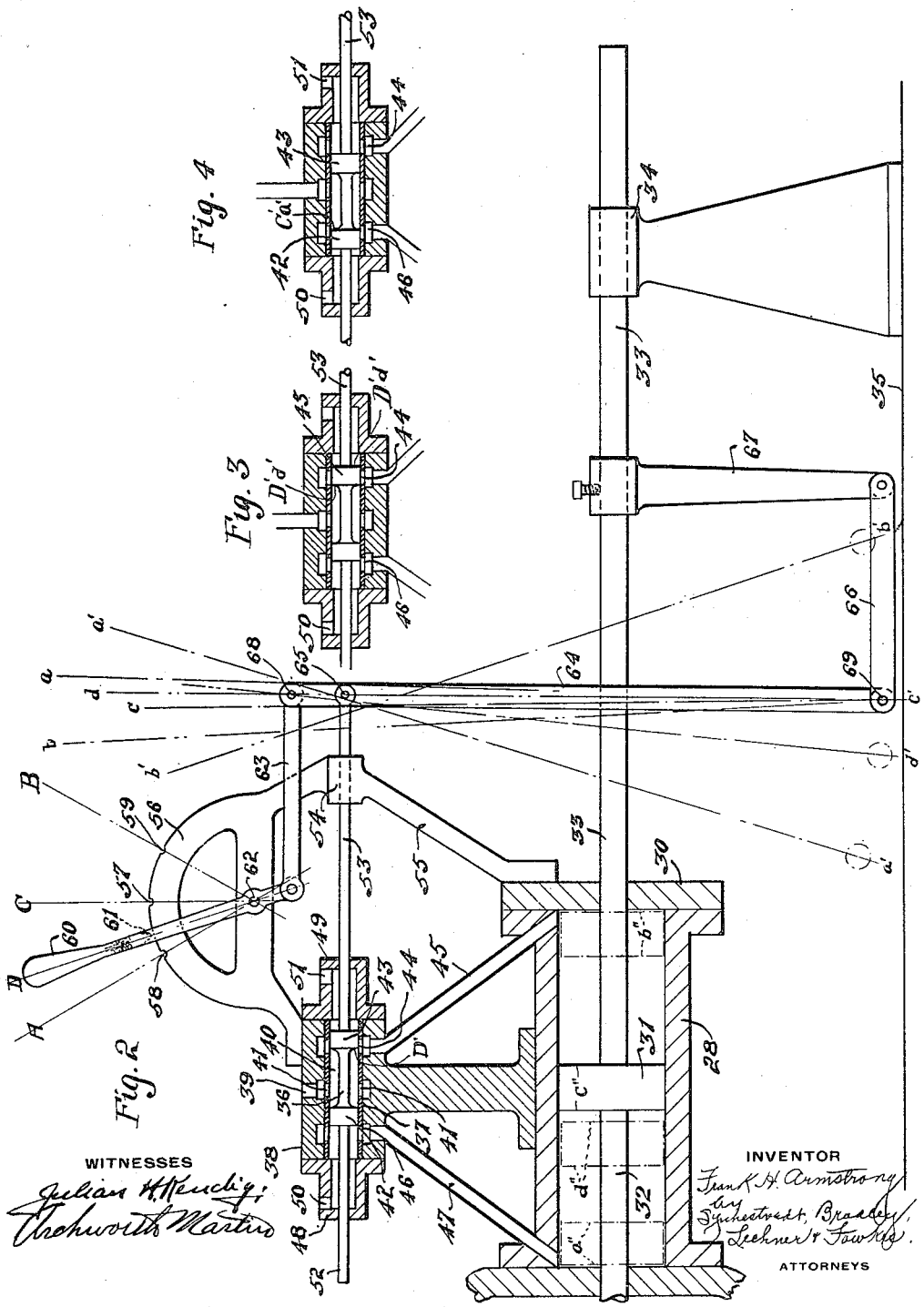

FRANK H. ARMSTRONG, OF VULCAN, MICHIGAN.

VALVE APPARATUS.

1,214,496.

Specification of Letters Patent.

Patented Feb. 6, 1917.

Application filed February 25, 1915. Serial No. 10,693.

*To all whom it may concern:*

Be it known that I, FRANK H. ARMSTRONG, a citizen of the United States, residing at Vulcan, in the county of Dickinson and State of Michigan, have invented certain new and useful Improvements in Valve Apparatus, of which the following is a specification.

The invention relates to valve apparatus, and more particularly to that class of valve apparatus used in controlling hydraulic machinery such as excavators, etc., and has for its principal objects the provision of apparatus wherein the valve is under the control of the operator and responds to the movement of the control lever with great precision and promptness; the provision of a valve mechanism wherein the main valve is controlled by means of a pilot valve, and responds accurately to the operation of the pilot valve; the provision of a valve mechanism wherein predetermined positions of the pilot valve and operating lever therefor results in the main valve occupying a predetermined position; the provision of a valve mechanism wherein the main valve is moved into neutral position when the pilot valve is moved into neutral position; the provision of a valve mechanism that is simple, effective and durable, and such other objects as may hereinafter appear. One embodiment of the invention is shown in the accompanying drawings, wherein—

Figure 1 is a longitudinal section through the valve mechanism; Fig. 2 is an enlarged longitudinal section of the valve operating cylinder and the pilot valve showing the controlling levers; Fig. 3 is a longitudinal section through the pilot valve showing the valve piston in an operative position different from the position of the piston in Figs. 1 and 2; and Fig. 4 is a longitudinal section of the pilot valve showing the piston in still another position.

Referring more particularly to Figs. 1 and 2, the device comprises a main valve casing 1 in which is mounted a cylindrical port sleeve 2, the valve casing 1 being provided at one end with the head 3 and at the other end with a flanged pipe 4 leading to a T joint 5 which communicates with a suitable storage tank (not shown) by means of the connecting pipe 6. The head 3 is provided with a port 3' which is also connected to the storage tank by means of a connection 3'' thereby giving storage tank pressure upon each end of the main valve.

The cylindrical port sleeve 2 constitutes a valve chamber 7 in which is reciprocally mounted a piston valve 8 which is adapted to control the passage of fluid from a suitable high pressure tank (not shown) which communicates with the valve by means of the connecting pipe 9 which is secured to the inlet passage 10 of the valve casing. The inlet passage 10 is provided with a circumferential groove 11 surrounding the port sleeve, and the sleeve is provided with a plurality of port holes 12 which register with the circumferential passage 11, through which the fluid passes into the valve chamber.

At the opposite side of the valve and out of line with the inlet passage 10 is a passage 13 which serves both as an outlet passage and an inlet passage according to whether fluid is being forced out through it or exhausted into the valve chamber through it, the passage communicating with the operating cylinder of the excavator (not shown) by means of the connecting pipe 14, the operation of such operating cylinder being accomplished by either forcing fluid under pressure out through the passage 13 or exhausting it in through such passage.

The passage 13 is provided with a circumferential groove 15 surrounding the port sleeve 2, and the sleeve is provided with a plurality of port holes 16 which establish communication between the circumferential groove 15 and the valve chamber 7.

The piston valve 8 is provided with a hollow reduced central portion 17 which serves to rigidly connect the two end pistons 18 and 19 of the piston valve, the head 18 being of greater diameter than the head 19, and the valve is held against rotation by means of the cross pin 20 secured to the valve casing and which engages the edges of the slot 21. It will be seen that in either extreme position of the valve, such extreme positions being reached when the ends of the pistons contact with the head 3 and the flange pipe 4, the ports 12 will discharge between the piston heads 18 and 19, thereby providing a force constantly tending to move the main valve toward the left because of the superior force exerted by the fluid between the heads upon the valve head 18 which is of greater area than the head 19. As shown in Fig. 1, the valve is in neutral or closed position, as no fluid can pass from the ports 12 into the passage 13, because the piston head 18 covers the ports 16. No fluid can be exhausted from the passage 13 for the reason as above stated. If, however, the valve is moved to the left, the ports 16 will be uncovered and fluid will pass from between the valve heads 18 and 19 out through the ports 16, and if the valve is moved to the right past the position shown in Fig. 1, the fluid in the pipe 14 will flow out through the T joint 5 and the passage 6 because of the opening of the port 16 to communication with the T joint 5.

The unbalanced pressure on the heads 18 and 19, due to their difference in size, tends to move the valve to the left, and in order to maintain the valve in neutral position, for reasons to be hereinafter explained, a centering cylinder 22 is mounted upon the head closing one end of the T joint 5, in which cylinder is mounted a piston 24 having a stem 25 projecting inwardly through the head 23 into the interior of the T joint 5. The piston head 18 is provided with a suitable tube 26, the free end of which is adapted to engage the free end of the stem 25, when the valve is in neutral or closed position and the piston 24 is in its extreme position toward the valve.

A pipe 27 connects the cylinder 22 with a suitable source of fluid pressure which is constantly supplied to such cylinder at sufficient pressure to hold the stem 25 in the position shown in Fig. 1, with a force, for example, of twice the force normally tending to move the valve toward the left due to the superior diameter of the head 18. It will be seen, therefore, that the valve 8 will occupy the neutral position shown in Fig. 1 because the force tending to move the valve to the left is but half the force exerted against the piston 24 which holds the stem 25 in its extreme right hand position.

As a valve of sufficient size to operate a large excavating machine is necessarily large, it is essential that means be provided for operating the valve by mechanical force, and that a means for controlling the operating means is also required. Referring to the right hand end of Fig. 1 and to Figs. 2, 3 and 4, the apparatus for operating and controlling the valve comprises a cylinder casing 28, mounted upon the valve casing head 3 by means of a combined cylinder head and bracket 29. The other end of the cylinder 28 is provided with a head 30. Within the cylinder is a piston 31, having the same length of stroke therein as the stroke of the main valve 8, and which is connected thereto by means of the piston rod 32. On the other side of the piston 31, extends a piston rod 33 through the head 30, and which is supported at its free end by a guide 34 secured to the base 35 of the excavator.

Upon the upper side of the operating cylinder 28 is mounted a pilot valve 36 of the balanced piston type carried in a cylindrical sleeve 37 which is supported within the pilot valve casing 38. An inlet port 39 connected to a suitable pressure supply, preferably the same one which is used for supplying pressure to the cylinder 22, leads to the piston chamber 40 through the ports 41, such ports being centrally disposed with respect to the valve chamber 40 and adapted to supply fluid to the chamber between the piston valve heads 42 and 43. At the right hand end of the valve chamber 40 is a port 44 in the sleeve 37 communicating with the right hand end of the cylinder 28 by means of a tube 45, and at the left end of the valve chamber 40 is a port 46 communicating with the left end of the cylinder 28 by means of a tube 47.

The pilot valve cylinder 38 is provided at each end with hollow heads 48 and 49 which are provided with exhaust ports 50 and 51, respectively. Movement of the piston valve 36 to the right or left causes the valve head 43 to alternately open the port 44 to receive pressure from the valve chamber 40 or exhaust pressure through the exhaust port 51, and similarly it causes the piston head 42 to exhaust pressure from the port 46 through the port 50, or to receive pressure from the valve chamber 40.

The piston valve 36 is provided with a guide stem 52 at one end and at the other end with an operating stem 53, the free end of the stem 53 being guided and supported by means of a guide 54 which is supported by the bracket 55 secured to the cylinder head 30. The guide 54 assists in supporting a sector 56 which is provided with a central notch 57 and two notches 58 and 59 determining and limiting the extreme movement of an operating lever 60, a yielding spring held tooth 61 serving to temporarily retain the lever in the positions indicated.

The operating lever 60 is pivoted to the sector at 62, and to the lower end of the lever is pivoted a link 63, which is pivotally connected to the upper end of the floating lever 64. At a point 65 below the upper end of the floating lever, the pilot valve operaing stem 53 is pivoted, and the lower end of the floating lever is pivotally connected to the operating piston rod 33 by means of the link 66 pivotally supported by the bracket 67 which is adjustably secured to the piston rod 33. It will be observed that by this arrangement of the floating lever, when the operating lever 60 is stationary and the piston rod 33 is moved the floating lever will oscillate about the upper pivot 68, and that when the piston rod 33 is stationary and the operating lever 60 is moved the floating lever will oscillate about the lower pivot 69, both operations resulting in movement of the pilot valve stem 53 and consequently movement of the pilot valve. Therefore the pilot valve is controlled by both the operating lever 60 and the operating piston 31. The purpose of such control of the pilot valve will hereinafter appear.

The operation of the valve apparatus is as follows:—Assuming that the main valve 8 and the pilot valve 36 are in closed or neutral position, as shown in Fig. 1, and it is desired to cause the main valve 8 to move a short distance to the left, thereby causing the port 16 to be partly uncovered by the piston valve head 18 to admit fluid from the passage 10 into the machine through the passage 13. Before the operation is started, the operating lever 60 (Fig. 2) is at central position C indicated by a dotted line, and the floating lever 64 is at central position c, indicated by a dotted line, and the operating piston is in the central position shown in Figs. 1 and 2.

To accomplish the previously referred to operation the operating lever 60 is first moved to the left into position D, as shown in Fig. 2, such movement forcing the floating lever 64 into position d, the operating lever pivoting at the stationary point 69, because the piston rod 33 is at such time stationary. Movement of the operating lever 60 to position D moves the pilot valve piston 36 to the position D', shown in Fig. 2, permitting of the passage of fluid pressure to pass through the inlet port 39 and out through the port 44 which is then uncovered by the piston head 43. The fluid passing through the port 44 passes into the right hand end of the operating cylinder 28 through the tube 45, thereby causing the piston 31 to be moved to the left, the fluid on the left side of the piston 31 at such time exhausting through the tube 47, port 46, valve chamber 40 at left of the piston valve 36 and out through the exhaust port 50.

Assuming that the operating lever 60 is held in the position D by the operator, the movement of the operating piston 31 to the left will result in the moving of the floating lever 64 to the left about the pivot 68, the operating lever being moved through the media of the piston rod 33, the bracket 67 and the connecting link 66. Such movement of the floating lever will cause the pilot valve 36 to be moved to the left and such movement of the pilot valve will continue until it is moved into the position D'd' shown in Fig. 3, at which time the port 44 is again closed by the piston head 43, thereby cutting off the entrance of fluid to the right side of the operating cylinder 28 and arresting further movement of the piston 31.

The movement of the pilot valve 36 from the position D' shown in Fig. 2, to the closed position D'd' shown in Fig. 3, required that the floating lever be moved to the position d' indicated by a dotted line, the floating lever occupying that position when the operating piston 31 had been moved to the left into the position d'' indicated in dotted lines in Fig. 2. Therefore, movement of the operating lever 60 to position D results in movement of the operating piston 31 to the postion d'', Fig. 2, and the consequent movement of the main valve to position $d^3$ indicated by a dotted line in Fig. 1.

Inasmuch as there is a force exerted by the piston 31, equal to the opposing force of the piston 24 in the centering cylinder 22, the main valve will be moved to the left by the pressure existing in the center of the main valve which is exerted upon the main valve head 18, the forces of the operating piston 31 and the centering piston 24 at such time being balanced.

It will be remembered that the force of the centering piston 24 is, for example, twice the force tending to force the main valve toward the left which is exerted upon the head 18 of the main valve, and the tendency of the centering piston is, therefore, to constantly center the main valve when there is no greater opposing force toward the left; so that after the fluid supply to the right end of the operating cylinder 28 has been shut off so there is no longer a greater opposing force exerted toward the left, it is necessary to trap the fluid upon the right side of the operating piston 31 so that the then superior force of the centering piston 24 will not return the main valve 8 to its original neutral or central position. By referring to Fig. 3 it will be seen that the piston head 43 completely covers the port 44 so that no fluid can escape from the right side of the operating cylinder 28. Therefore, the main valve will be maintained in the position $d^3$ against the force of the centering piston 24.

It will be seen from the foregoing that every movement of the operating lever 60 to the left will result in a proportionate movement of the main valve toward the left, and that the main valve will remain in each new position until the operating lever is again moved. Every movement of the operating lever to the left moves the pilot valve 36 to the right from the position D'd' and such movement of the pilot valve results in the floating lever being moved to the left by the operating piston 31, sufficient distance to return the pilot valve to position D'd'.

When the operating lever 60 is moved to its extreme left hand position A indicated by a dotted line, so that the tooth 61 engages the notch 58, the floating lever will be in the position $a$, indicated by a dotted line, such movement resulting in the floating lever being moved to the position $a'$ and the piston 31 being moved to the extreme position $a''$, indicated in dotted lines, this movement bringing the pilot valve to the position D'd'. When the operating piston 31 is in the extreme left position the main valve occupies its extreme left position $a^3$, Fig. 1, indicated by a dotted line. At such time the port 16 is completely uncovered and the machine is receiving a full charge of fluid.

When it is desired to stop the flow, assuming that the main valve is in the wide open position $a^3$, and that the operating lever is in the position A and the pilot valve in the position D'd' as shown in Fig. 3, the operator simply moves the operating lever to the right until it is in the central position C indicated by a dotted line, when the tooth 61 will engage the notch 57.

Movement of the operating lever 60 to position C when the floating lever is in the position $a'$ will result in the pilot valve occupying the position $c'a'$ as shown in Fig. 4. Such position of the pilot valve will open the port 44 so that the fluid in the right end of the operating cylinder may exhaust through the exhaust port 51, thereby permitting the main valve to be shoved to the right until it reaches central position by the centering piston 24 which has a force superior to the constant unbalanced pressure between the main valve heads tending to move the main valve toward the left.

The ports of the pilot valve chamber are so spaced, the valve heads so positioned and the lap of the valve heads so arranged that when the operating lever 60 is out of central or neutral position, the pilot valve will cause movement of the main valve, and the supply port supplying fluid to the operating cylinder which causes the movement of the main valve will be cut off from the exhaust port when the pilot valve has closed the supply port, in order to arrest movement of operating piston and consequently the movement of the main valve. If, however, the operating lever 60 be moved to central or neutral position, regardless of the position of the operating piston and the floating lever, such supply port which had been previously shut off from the exhaust will be open to the exhaust permitting the operating piston and the main valve to be subsequently centered. It is immaterial, from which side of the sector the lever is moved, for the result will be the same, $i. e.$ the centering devices are free to act upon the main valve to move it to central position.

If the operating lever 60 is moved to the right or to the position B indicated by a dotted line, the pilot valve 36 will be moved to the left to its extreme left hand position, thus opening the port 46 so that fluid may pass from the inlet port 39 through the port 46 and passage 47 into the left end of the operating cylinder 28, and force the operating piston 31 to the right hand position $b''$ indicated by dotted lines, Fig. 2, which in turn forces the main valve 8 to the right hand position $b^3$ indicated by a dotted line, Fig. 1. It will be remembered that in moving the main valve from central or neutral position toward the right requires that the force normally tending to move the main valve toward the left be overcome, and as the force exerted against the operating piston 31 when the pilot valve is open is, for example, twice that exerted by the fluid between the main valve heads, the main valve will move to the right when pressure is applied to the left side of the operating piston 31.

When the operating lever is in any position to the right of the central or neutral position C the floating lever 64 will bring the pilot valve to rest at the point where it just closes the port 46, or in other words, a position just the reverse of the position of the valve shown in Fig. 3. Thus the port 46 will be closed from the exhaust port 50 and the fluid in the left end of the operating cylinder will be trapped therein, holding the operating piston 31 against movement due to the differential pressure between the heads 18 and 19.

Briefly stated, movement of the operating lever 60 to the right any distance, causes the main valve to be moved to the right a proportional distance, thereby permitting fluid to flow through the passage 13 and port 16 out into the storage tank (not shown) through the connecting pipe 6. The main valve will remain in any desired position as long as the operating lever is caused to remain stationary. Movement of the operating lever from any position left or right of the center of the sector, to the central or neutral position C causes the main valve to move to central position. When the main valve is to the right of its central or neutral position, fluid is exhausted from the machine (not shown) through the pipe 14, and the main valve is returned to central position when desirable by means of the constant fluid pressure between the main valve heads which tends to move the main valve toward the left, this action occurring after the pilot valve is moved to open the proper exhaust for the fluid in the operating cylinder.

When the main valve is to the left of its central or neutral position, fluid is forced outward to the machine (not shown) through the port 16, passage 13 and connecting pipe 14, and the main valve is returned to central or neutral positions, when desirable, by means of the constant force exerted by the centering piston 24 against the shaft 26 carried by the main valve 8, after the pilot valve is moved to open the proper exhaust for the fluid in the operating cylinder.

One of the purposes in providing the main valve with means to center it is to permit the use of lap upon the pilot valve, and it will be observed that the pilot valve heads are of greater width than the ports, thereby providing sufficient lap over the ports to prevent leakage when the valve is in closed or neutral position. If the pilot valve had no lap and were coupled to a valve operating cylinder and piston in the manner described, the main valve would come to center at the same time that the pilot valve closed the port opening which would be exactly when the pilot valve had come to center, but it is not practicable to use valves with no lap, especially in such heavy service, so that valves must be lapped, and in the apparatus shown and described the valves are supplied with sufficient lap to make them operate effectively. To illustrate, and referring to Fig. 4, wherein the pilot valve is in the position it will occupy when the operating lever is moved to center C, while the floating lever is in the position $a'$, it will be seen that the instant the port 46 is closed by the movement of the pilot valve to the right no further movement of the operating piston 31 to the right is possible. Therefore, with the lap shown and without a centering device the main valve would remain open in a position somewhere between positions $a^3$ and $d^3$. The operating cylinder at such time is therefore not capable of moving the valve, and the valve must be centered or closed by the centering cylinder.

The advantage of centering the main valve to closed or neutral position when the operating lever is in a central position, is the perfect control the operator has over the valve and therefore the machine. Moving the operating lever to the center notch 57 always stops the machine by causing the valve to be moved to neutral position. The operator knows that movement of the lever in one direction past center opens the main valve a corresponding distance in one direction, and reversal of the operating lever past center reverses the main valve a corresponding distance, thus a perfect control is provided.

While the construction shown and described is the preferred form the invention is not limited to the specific disclosure as numerous changes in detail may be made without departing from the spirit of the invention.

What I claim is:

1. The combination with a controlling mechanism for hydraulic machines having a main valve, means for operating the main valve and a pilot valve having sufficient lap to prevent leakage for controlling fluid to the operating means, of a means independent of the main valve operating means for moving the main valve to neutral position when the pilot valve cuts off the supply of fluid to the operating means.

2. The combination with a controlling mechanism for hydraulic machines having a main valve, means for operating the main valve and a pilot valve having sufficient lap to prevent leakage for controlling fluid to the operating means controlled by the operating means, of means independent of the main valve operating means for moving the main valve to neutral position when the pilot valve cuts off the supply of fluid to the operating means.

3. In combination in a controlling mechanism for hydraulic machines, a main valve for controlling fluid for operating the machine, means for operating the main valve, a pilot valve having sufficient lap to prevent leakage for controlling the operating means, a lever operated by the operating means for controlling the pilot valve and adapted to move the pilot valve to cut off position when the main valve is out of neutral position, and automatic means independent of the main valve operating means for moving the main valve to neutral position after the pilot valve is moved to cut off position.

4. In combination in a controlling mechanism for hydraulic machines, a main valve for controlling fluid for operating the machine, means for moving the main valve from neutral position to operative position, a pilot valve having sufficient lap to prevent leakage for controlling the operating means having a neutral and operative position, and automatic means independent of the valve moving means whereby the main valve is moved from operative to neutral position when the pilot valve has been moved to neutral position.

5. A controlling mechanism for hydraulic machines comprising a valve chamber, a valve in the chamber for controlling the fluid for the machine, pressure means exerting a constant force on the valve adapted to move it in one direction, a yielding means for opposing the force of the first means and valve operating means independent of the other means for moving the valve.

6. A controlling mechanism for hydraulic machines comprising a valve chamber, a valve in the chamber for controlling the fluid for the machine, pressure means exerting a constant force on the valve adapted to move it in one direction, a yielding means for opposing the force of the first means and valve operating means independent of the other means for moving the valve, the first and second means jointly serving to maintain the valve in a predetermined position when the valve operating means is inoperative.

7. The combination with a valve for controlling a fluid actuated machine, having fluid pressure constantly exerted thereon tending to move it in one direction, and means for operating the valve, of a yielding means for holding the valve in a predetermined position against the force of the pressure, the valve operating means being adapted to operate against the yielding means to move the valve out of the predetermined position.

8. A controlling mechanism for hydraulic machines, comprising in combination a main valve having an operative and a neutral position, means for operating the main valve and a means independent of the operating means for moving the main valve to neutral position when the operative means is inoperative.

9. A controlling mechanism for hydraulic machines, comprising in combination a main valve having an operative and a neutral position, means for operating the main valve, a pilot valve for controlling the said means, and power means independent of the said means for moving the main valve to neutral position.

10. The combination with a main valve for hydraulic machines controlled by a pilot valve having a valve face of greater length than the valve ports and controlled by a floating lever carried by the main valve, of a means independent of control by the pilot valve for centering the main valve after the pilot valve has covered the valve ports.

11. A controlling mechanism for hydraulic machines comprising in combination, a main admission valve with a constant force tending to move it in one direction, constant yielding means for exerting a greater force against the valve in the opposite direction to normally hold the main valve in a predetermined neutral position and means for operating the valve in either direction.

12. A controlling mechanism for hydraulic machines, comprising in combination a main valve having an operative and a neutral position, fluid pressure means for operating the main valve, a pilot valve controlling said fluid pressure means, and itself governed by the movement of the main valve, and power means independent of the fluid pressure means for moving the main valve to neutral position, when the action of the main valve upon the pilot valve causes such valve to cut off the supply of fluid to the said fluid pressure means.

13. A controlling mechanism for hydraulic machines, comprising in combination a main valve having an operative and a neutral position, fluid pressure means for operating the main valve, a pilot valve controlling said fluid pressure means, a floating lever for operating the pilot valve and itself governed by the main valve, and power means independent of the fluid pressure means for moving the main valve to neutral position, when the action of the main valve upon the floating lever and pilot causes such valve to cut off the supply of fluid to the said fluid pressure means.

In testimony whereof I have hereunto signed my name in the presence of the two subscribed witnesses.

F. H. ARMSTRONG.

Witnesses:
T. R. TRUDGEON,
H. K. MYERS.